US007810384B2

(12) United States Patent
Ono et al.

(10) Patent No.: US 7,810,384 B2
(45) Date of Patent: Oct. 12, 2010

(54) POWER TURBINE TEST APPARATUS

(75) Inventors: Yoshihisa Ono, Nagasaki-ken (JP);
Keiichi Shiraishi, Nagasaki-ken (JP)

(73) Assignee: Mitsubishi Heavy Industries, Ltd.,
Tokyo (JP)

( * ) Notice: Subject to any disclaimer, the term of this
patent is extended or adjusted under 35
U.S.C. 154(b) by 21 days.

(21) Appl. No.: 11/892,704

(22) Filed: Aug. 27, 2007

(65) Prior Publication Data

US 2008/0236261 A1 Oct. 2, 2008

(30) Foreign Application Priority Data

Feb. 23, 2007 (JP) .............................. 2007-044031

(51) Int. Cl.
*G01M 15/14* (2006.01)
(52) U.S. Cl. .................................... 73/112.01
(58) Field of Classification Search ............. 73/112.01,
73/112.03, 112.05
See application file for complete search history.

(56) References Cited

U.S. PATENT DOCUMENTS

| 6,178,733 | B1 * | 1/2001 | Nelson ........................ 60/778 |
| 6,216,441 | B1 * | 4/2001 | Stats et al. ............... 60/39.182 |
| 6,220,086 | B1 * | 4/2001 | Andrew et al. ........... 73/112.06 |
| 6,237,320 | B1 * | 5/2001 | Stats et al. ................... 60/780 |
| 2001/0001171 | A1 * | 5/2001 | Onoda et al. ............... 60/39.06 |
| 2004/0154385 | A1 * | 8/2004 | Acker .......................... 73/116 |
| 2006/0053882 | A1 * | 3/2006 | Lee et al. ...................... 73/460 |
| 2007/0261492 | A1 * | 11/2007 | Board .......................... 73/587 |
| 2008/0203732 | A1 * | 8/2008 | Ono et al. ..................... 290/52 |

FOREIGN PATENT DOCUMENTS

| JP | 63-118340 U | 7/1988 |
| JP | 2-241926 A | 9/1990 |

* cited by examiner

*Primary Examiner*—Eric S McCall
(74) *Attorney, Agent, or Firm*—Westerman, Hattori, Daniels
& Adrian, LLP

(57) ABSTRACT

The invention provides a power turbine test apparatus able to significantly reduce the equipment cost and testing cost required for an independent operation test of a test object power turbine. The power turbine test apparatus for independently operating and testing a power turbine that drives a driven machinery using combustion gas or steam, comprises: an air compressor that supplies compressed outside air to a combustor positioned on a downstream side; a first air duct that guides the outside air compressed by the air compressor into the combustor; a combustor which combusts the compressed outside air and fuel to generate combustion gas; and a second air duct that guides the combustion gas generated by the combustor to the power turbine installed on the downstream side; wherein a rotating shaft of the power turbine and a rotating shaft of the air compressor are joined to each other, and power of the power turbine is recovered by the air compressor.

4 Claims, 2 Drawing Sheets

POWER TURBINE TEST APPARATUS

BACKGROUND OF THE INVENTION

1. Field of the Invention

The present invention relates to a power turbine test apparatus for testing a power turbine, in particular, for independently operating and testing a power turbine to be mounted in an internal combustion engine for a ship or in an internal combustion engine for a land power generator.

This application is based on Japanese Patent Application No. 2007-044031, the content of which is incorporated herein by reference.

2. Description of Related Art

As a power turbine to be mounted in an internal combustion engine for a ship or in an internal combustion engine for a land power generator, for example, those disclosed in Japanese Unexamined Patent Application, Publication No. Hei 02-241926 and Japanese Unexamined Utility Model Application, Publication No. Sho 63-118340 are known.

Conventionally, in the case of carrying out an independent operation test on such a turbine prior to shipping, or in response to a request of a customer or a classification society, a method is used, in which compressed air generated by a large size auxiliary blower is supplied to the test object power turbine to rotate a rotation shaft of the power turbine, while a dynamometer for load absorption linked via reduction gears absorbs (recovers) the power obtained by this rotation. Accordingly, reduction gears, a dynamometer, and a large size auxiliary blower are required to carry out an independent operation test of a power turbine, and as a result there is a problem of high equipment cost.

Furthermore, since a large amount of electric power is required in order to operate a large auxiliary blower, there is a problem of high testing cost.

BRIEF SUMMARY OF THE INVENTION

The present invention takes the above circumstances into consideration and its object is to provide a power turbine test apparatus able to significantly reduce the equipment cost and testing cost required for an independent operation test of a test object power turbine.

The present invention employs the following means in order to solve the above problems.

A power turbine test apparatus according to the present invention is a power turbine test apparatus for independently operating and testing a power turbine that drives a driven machinery using combustion gas or steam, and comprises: an air compressor that supplies compressed outside air to a combustor positioned on a downstream side; a first air duct that guides the outside air compressed by the air compressor into the combustor; a combustor which combusts the compressed outside air and fuel to generate combustion gas; and a second air duct that guides the combustion gas generated by the combustor to the power turbine installed on the downstream side; wherein a rotating shaft of the power turbine and a rotating shaft of the air compressor are joined to each other, and power of the power turbine is recovered by the air compressor.

According to this power turbine test apparatus, the power of the test object power turbine is absorbed (recovered) by the air compressor, the compressed air generated by this air compressor is consumed by the combustor, and the combustion gas generated by this combustor is consumed by the power turbine. That is to say, power of the power turbine no longer needs to be absorbed (recovered) by a dynamometer for load absorption linked via reduction gears as practiced conventionally, and furthermore a large size auxiliary blower for driving the power turbine is no longer required. As a result, the equipment cost and the testing cost required for an independent operation test of a power turbine can be significantly reduced.

Preferably the power turbine test apparatus is provided with an auxiliary blower that supplies compressed air when the power turbine starts up.

According to such a power turbine test apparatus, when the power turbine starts up, compressed air is supplied from the auxiliary blower to the power turbine and this compressed air drives the power turbine.

A power turbine test method according to the present invention is a power turbine test method for independently operating and testing a power turbine that drives a driven machinery using combustion gas or steam, comprising: combusting outside air compressed by an air compressor, and fuel, in a combustor to obtain combustion gas, and driving said power turbine installed on the downstream side with this combustion gas, and driving said air compressor with power of the power turbine.

According to this power turbine test method, the power of the test object power turbine is absorbed (recovered) by the air compressor, the compressed air generated by this air compressor is consumed by the combustor, and the combustion gas generated by this combustor is consumed by the power turbine. That is to say, power of the power turbine no longer needs to be absorbed (recovered) by a dynamometer for load absorption linked via reduction gears as practiced conventionally, and furthermore a large size auxiliary blower for driving the power turbine is no longer required. As a result, the equipment cost and the testing cost required for an independent operation test of a power turbine can be significantly reduced.

In the power turbine test method, it is more preferable if compressed air is supplied from an auxiliary blower when the power turbine starts up.

According to such a power turbine test method, when the power turbine starts up, compressed air is supplied from the auxiliary blower to the power turbine and this compressed air drives the power turbine.

According to the present invention, an effect of a significant reduction in the equipment cost and testing cost required for an independent operation test of a test object power turbine can be achieved.

DETAILED DESCRIPTION OF THE INVENTION

Figure 1:
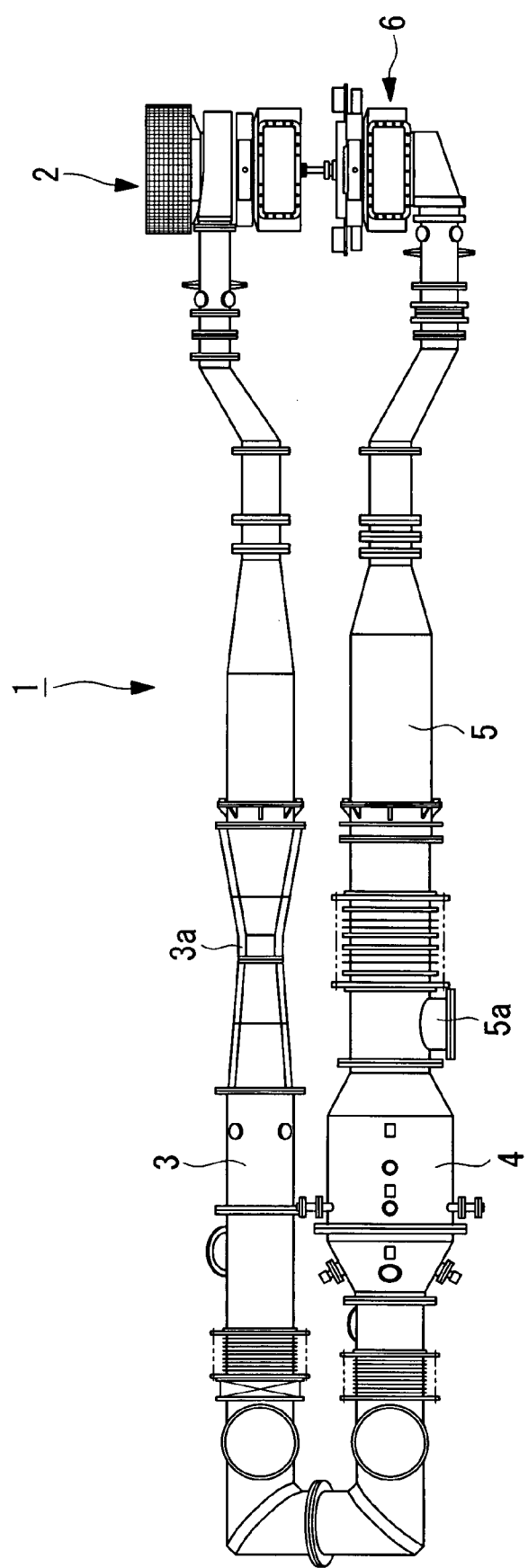
FIG. 1 is an overall schematic configuration diagram of a power turbine test apparatus according to an embodiment of the present invention.

Hereunder an embodiment of a power turbine test apparatus is described, with reference to the drawings. FIG. 1 is an overall schematic configuration diagram of a power turbine test apparatus according to an embodiment of the present invention, and FIG. 2 is an enlarged sectional view of the main parts of FIG. 1.

As shown in FIG. 1, a power turbine test apparatus 1 according to the present embodiment comprises main components namely: an air compressor 2; a first air duct 3; a combustor 4; and a second air duct 5.

Figure 2:
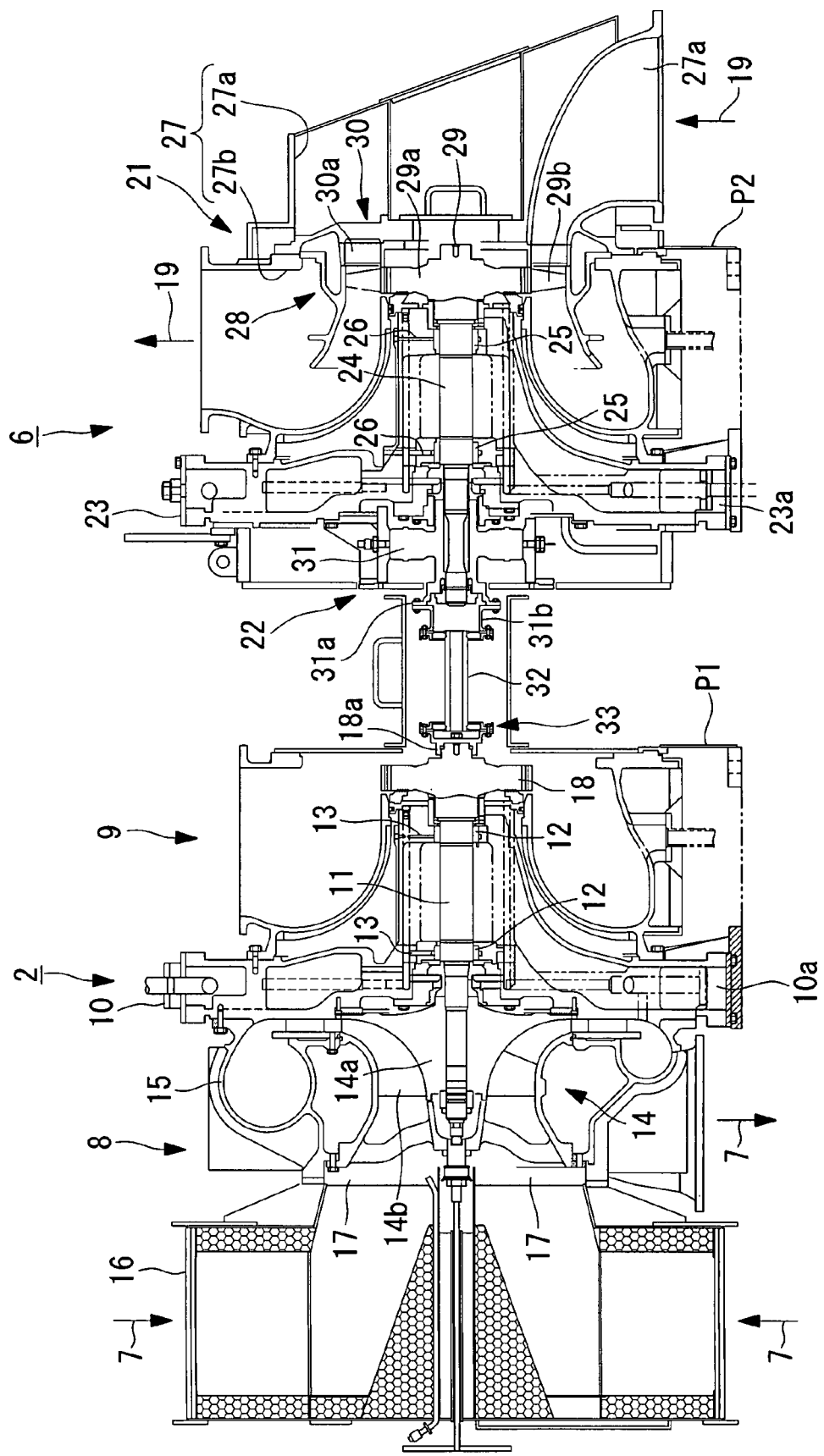
FIG. 2 is an enlarged sectional view of the main parts.

The air compressor 2 is a centrifugal compressor shown for example in FIG. 2, having a structure in which a turbine portion of a turbocharger is replaced with a counter weight, and it comprises main components, namely: a compressor section 8 that is driven by a test object power turbine 6 to pressure-feed outside air 7 into the combustor 4 (refer to FIG. 1); and a casing 10 that is provided between a counter weight section 9 and a compressor section 8 so as to support them.

A rotating shaft 11, one end of which projects out into a counter weight section 9 side and the other end of which projects out into a compressor section 8 side, is inserted through the casing 10. This rotating shaft 11 is supported by a bearing 12 provided in the casing 10 so as to be able to rotate about its axis. Moreover, in the casing 10, there is provided a lubricating oil supply passage 13 that supplies lubricating oil from a lubricating oil reservoir (not shown in the drawing) to the bearing 12.

Meanwhile, a bottom end section of the casing 10 becomes a foot section 10a that supports the casing 10 at a point in the axial direction of the rotating shaft 11 (in some cases it is supported at two or more points in the direction orthogonal to the axial direction of the rotating shaft 11), and this foot section 10a is fixed on a base (not shown in the drawing) installed on a floor surface. That is to say, the weight of the air compressor 2 is transmitted to the base through this foot section 10a.

Reference symbol P1 in the drawing denotes a punching plate. One end section of this punching plate P1 is fixed on the bottom end section of the counter weight section 9 and the other end is fixed on the base as with the foot section 10a of the casing 10. The principal purpose of this punching plate P1 is not to support the weight of the air compressor 2 as with the foot section 10a, but to ensure that the air compressor 2 does not shake (vibrate) with respect to the base.

The compressor section 8 has: a compressor impeller 14 that is rotation-driven to send outside air 7 to the radial direction outside; and a spiral shaped chamber 15 that surrounds this compressor impeller 14 and compresses the outside air 7 sent from the compressor impeller 14.

The compressor impeller 14 is provided with: a substantially disk shaped hub 14a attached to the other end section of the rotating shaft 11; and a plurality of impeller blades 14b that extend from an external surface of the hub 14a toward the outside in the radial direction and that are annularly provided around the circumferential direction.

On the immediate upstream side of the compressor section 8 there is arranged a silencer 16, and the outside air 7 that has passed through this silencer 16 is guided through an inflow passage 17 to the impeller blades 14b of the compressor impeller 14. Moreover, as shown in FIG. 1, on the downstream side of the compressor section 8 there is provided the first air duct 3, and the outside air 7 that has passed through the spiral shaped chamber 15 travels through the first air duct 3 to be supplied into the combustor 4.

In the present embodiment, a disk shaped counter weight (balance weight) 18 is attached to the one end section of the rotating shaft 11 (that is to say, to the end section to which a turbine disk is attached (fixed) in the case of using the air compressor 2 as a turbocharger). Furthermore, a first coupling-attachment boss 18a is attached to an axial end side end section of the counter weight 18.

As shown in FIG. 1, the first air duct 3 is a flow passage for guiding the outside air 7 compressed by the air compressor 2 into the combustor 4, and a venturi tube 3a is arranged part way along the first air duct 3.

The combustor 4 is a device for generating combustion gas 19 (refer to FIG. 2) by combusting the outside air 7 pressure-fed through the first air duct 3 and fuel such as LNG (liquid natural gas) and kerosene.

The second air duct 5 is a flow passage (passageway) for guiding the combustion gas 19 generated by the combustor 4, or outside air that has been pressure-fed from an auxiliary blower (not shown in the drawing) into the test object power turbine 6 installed in a downstream side end section of the second air duct 5, and on the upstream side of the second air duct 5 there is connected an air supply pipe 5a that guides outside air compressed by the auxiliary blower into the second air duct 5.

Outside air compressed by the auxiliary blower is guided into the second air duct 5 when the power turbine 6, is starting up, or in the case where the rotation speed of the power turbine is too low for the air compressor 2 to be able to send the required minimum amount of compressed air to the combustor 4. Therefore, a large size auxiliary blower of large electric power is not required and a small size auxiliary blower of small electric power is employed.

As shown in FIG. 2, the test object power turbine 6 comprises the following main components namely: a turbine section 21 that is driven by steam or by exhaust gas (combustion gas) guided from an internal combustion engine (for example, a diesel engine), a power transmission section (driving section) 22 that is driven by this turbine section 21 to drive auxiliary machinery (for example, a power generator, an air compressor, or the like), and a casing 23 that is provided between these turbine section 21 and the power transmission section 22 so as to support them.

A rotating shaft 24, one end of which projects out into a turbine section 21 side and the other end of which projects out into a power transmission section 22 side, is inserted through the casing 23. This rotating shaft 24 is supported by a bearing 25 provided in the casing 23 so as to be able to rotate about its axis. Moreover, in the casing 23, there is provided a lubricating oil supply passage 26 that supplies lubricating oil from a lubricating oil reservoir (not shown in the drawing) to the bearing 25.

Meanwhile, a bottom end section of the casing 23 becomes a foot section 23a that supports the casing 23 at a point in the axial direction of the rotating shaft 24 (in some cases it is supported at two or more points in the direction orthogonal to the axial direction of the rotating shaft 24), and this foot section 23a is fixed on a base (not shown in the drawing) installed on a floor surface. That is to say, the weight of the power turbine 6 is transmitted to the base through this foot section 23a.

Reference symbol P2 in the drawing denotes a punching plate. One end section of this punching plate P2 is fixed on the bottom end section of the turbine section 21 and the other end is fixed on the base as with the foot section 23a of the casing 23. The principal purpose of this punching plate P2 is not to support the weight of the power turbine 6 as with the foot section 23a, but to ensure that the power turbine 6 does not shake (vibrate) with respect to the base.

The turbine section 21 is installed on and connected to an end section on the downstream side of the second air duct 5, it has a gas passage 27 into which the combustion gas 19 generated by the combustor 4 or outside air pressure-fed by an auxiliary blower (not shown in the drawing) is supplied; and a turbine 28 that receives the combustion gas 19 or outside air pressure-fed by the auxiliary blower supplied into this gas passage, to be rotation-driven.

The turbine 28 is provided with a turbine rotor 29 and a turbine nozzle 30. The turbine rotor 29 has: a disk shaped turbine disk 29*a* provided on one end section of the rotating shaft 24, and a plurality of turbine blades 29*b* having an airfoil sectional shape attached to the outer periphery of this turbine disk 29*a*.

Moreover, the turbine nozzle 30 comprises a plurality of nozzle guide vanes 30*a* that are annularly arranged, and is arranged on the upstream side of the turbine blade 29*b*.

The gas passage 27 has: a supply passage 27*a* that is connected to an end section on the downstream side of the <second air duct 5 to guide the combustion gas 19 to the nozzle guide vanes 30*a* and the turbine blade 29*b*, and a delivery passage 27*b* that is provided toward the radial direction outside of the turbine 28 to guide the combustion gas 19 that has passed the turbine 28 to outside of the system or to an exhaust gas purification device or the like (not shown in the drawing).

In the present embodiment, a disk shaped counter weight (balance weight) 31 is attached to the other end section of the rotating shaft 24 (to the end section to which a compressor impeller is attached (fixed) in the case of driving the air compressor). Moreover, on an axial end side end section of the counter weight 31 there is provided a flange 31*a*, and a second coupling-attachment boss 31*b* is removably attached to an axial end side end surface of this flange 31*a*.

The first coupling-attachment boss 18*a* and the second coupling-attachment boss 31*b* are linked with each other via a flexible coupling 32 and a plurality of bolt-nut combinations 33, and the rotating shaft 11 of the air compressor 2 and the rotating shaft of the power turbine 6 rotate together.

According to the power turbine test apparatus 1 of the present embodiment, the power of the test object power turbine 6 is absorbed (recovered) by the air compressor 2, the compressed air generated by this air compressor 2 is consumed by the combustor 4, and the combustion gas generated by this combustor 4 is consumed by the power turbine 6. That is to say, the power of the power turbine 6 no longer needs to be absorbed (recovered) by a dynamometer for load absorption linked via reduction gears as practiced conventionally, and furthermore a large size auxiliary blower for driving the power turbine 6 is no longer required. As a result, the equipment cost and testing cost required for an independent operation test of the power turbine 6 can be significantly reduced.

What is claimed is:

1. A power turbine test apparatus for independently operating and testing a power turbine that drives a driven machinery using combustion gas or steam, said power turbine test apparatus comprising:

an air compressor that supplies compressed outside air to a combustor positioned on a downstream side;

a first air duct that guides the outside air compressed by said air compressor into said combustor which combusts said compressed outside air and fuel to generate combustion gas;

a second air duct that guides the combustion gas generated by said combustor to said power turbine installed on the downstream side; and a rotating shaft of said power turbine under test and a rotating shaft of said air compressor are joined to each other by way of a linking member so that the power of said power turbine under test is absorbed by said air compressor of said power turbine test apparatus during testing operation, wherein said linking member connects a first coupling member attached to said rotating shaft of said air compressor to a second coupling member attached to said rotating shaft of said power turbine under test.

2. A power turbine test apparatus according to claim 1, provided with an auxiliary blower that supplies compressed air to power the power turbine when said power turbine starts up.

3. A power turbine test method in a power turbine test apparatus for independently operating and testing a power turbine under test that drives a driven machinery using combustion gas or steam, said power turbine test method comprising:

joining a rotating shaft of said power turbine under test and a rotating shaft of an air compressor to each other by way of a linking member, wherein said linking member connects a first coupling member attached to said rotating shaft of said air compressor to a second coupling member attached to said rotating shaft of said power turbine under test, combusting, in said power turbine test apparatus, outside air compressed by an air compressor, and fuel, in a combustor to obtain combustion gas, and driving said power turbine under test installed on the downstream side with this combustion gas, and driving said air compressor, in said power turbine test apparatus, with power of the power turbine under test.

4. A power turbine test method according to claim 3, comprising:

supplying compressed air from an auxiliary blower to power the power turbine when said power turbine starts up.

* * * * *